UNITED STATES PATENT OFFICE.

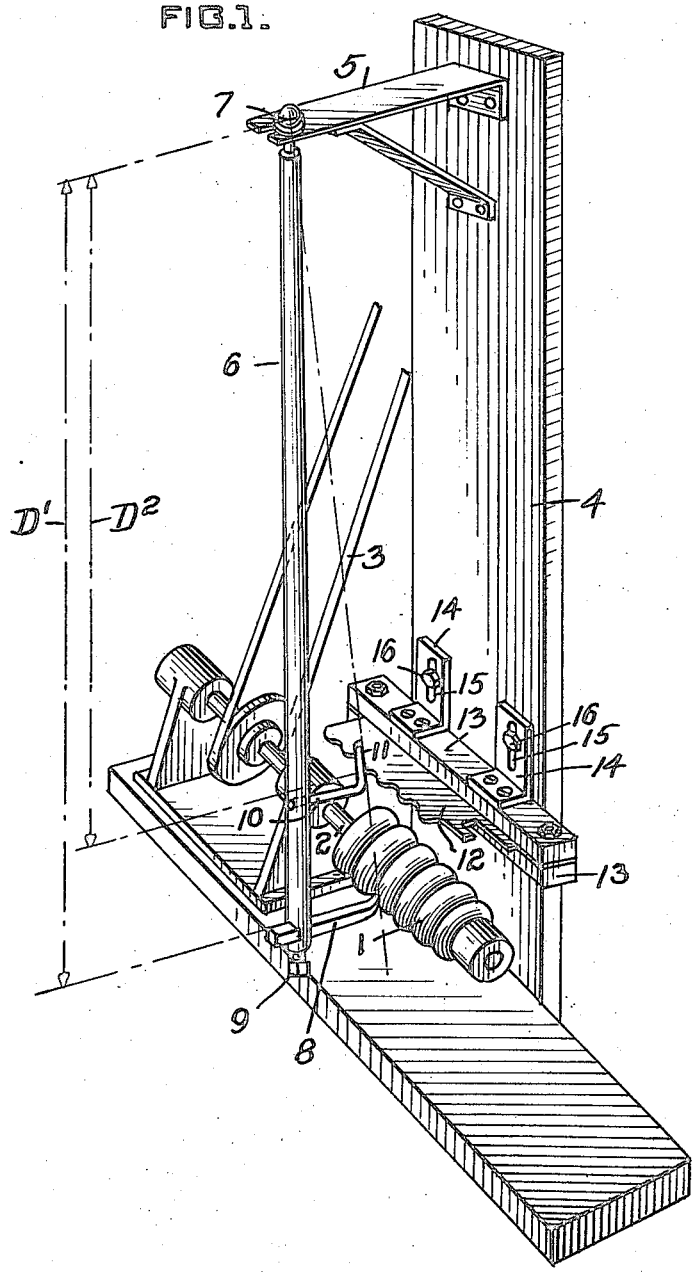
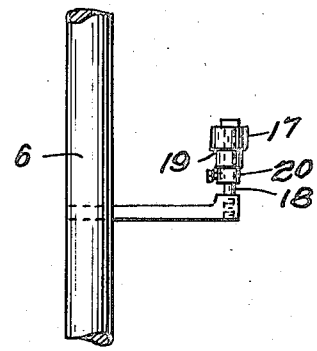

JOHN S. LAPP, OF LE ROY, NEW YORK, ASSIGNOR TO LAPP INSULATOR COMPANY, OF LE ROY, NEW YORK, A CORPORATION OF NEW YORK.

LATHE.

1,427,213.          Specification of Letters Patent.      Patented Aug. 29, 1922.

Application filed September 15, 1919. Serial No. 323,809.

*To all whom it may concern:*

Be it known that I, JOHN S. LAPP, a citizen of the United States, and a resident of Le Roy, in the county of Genesee and State of New York, have made a new and useful Invention in Lathes, of which the following is a specification.

My invention relates to lathes and in particular to lathes in which the cutting tool is guided by a templet for the rapid and accurate production of duplicate articles. It is often desired to produce articles similar in shape to a given article or to a given outline but differing therefrom in size. In the ordinary use of a templet this requires a separate templet for each size, or variation from a single original. The amount of such variation may be a matter of experiment and the desired templet only obtained after repeated trials. An example of such a condition is presented by the practise of turning articles from clay mixtures after partial drying but before firing.

The process of firing will cause the article, as turned in the lathe, to shrink appreciably but the amount or proportion of such shrinkage varies with different clay mixtures and with the dryness of the molded article at the time it is turned.

The problem is to produce quantities of articles which shall be similar in outline and size, not only at the time they are turned but after they have been fired and consequently have shrunk. To provide and apply a separate templet for each variation in the material or its condition when turned would involve a considerable expense and waste of time. By means of my invention the necessity of a plurality of templets is avoided.

I use a single templet to guide the cutting tool to produce an article similar in shape but varying in size from the templet. By providing means for adjusting the templet and varying its action on the cutting tool accordingly, a variation in the sizes of the turned articles may be made commensurate with the degree of subsequent shrinkage which has been determined by experiment or otherwise.

The means by which I accomplish my object is illustrated in the accompanying drawings in which Figure 1 is a view of a lathe being used to produce insulators and Fig. 2 is a preferred detail of one of the parts.

The insulator 1 is of any suitable clay composition which is machineable after drying but before firing. It is ordinarily turned when in a "leather hard" state. It is mounted on the spindle 2 of the lathe and is rotated in the usual manner by a driving belt 3. At the back of the lathe and extending upwardly is an upright 4, fixed with respect to the lathe and provided at its top, some distance above the lathe, with a bracket 5. This bracket extends over the lathe and at its outer extremity supports a tool holder 6 by an universal joint 7.

The lower end of tool holder 6 is provided with a square hole for the accommodation of the shank of a cutting tool 8. A set screw 9 secures the tool 8 when in position. A short distance above tool 8 is a guiding finger 10 having a shank secured to tool holder 6, approximately parallel with the shank of tool 8, and provided with an upright finger 11. A horizontal section through finger 11 at any point should have the same outline as a horizontal section through a conical figure whose base has the contour of the cutting edge of tool 8 and whose apex is the center of the universal joint 7.

Cooperating with finger 11 is a guiding templet 12 which may be secured by any suitable means to upright 4. I have shown the templet held by clamping members 13 which are fastened to upright 4 by means of angular clips 14. The slots 15 in clips 14, through which the fastening bolts 16 pass, are elongated to permit vertical adjustment of the templet.

Operation: In starting production of an article, the templet is located by judgment and clamped in position; tool holder 6 is swung to bring guiding finger 11 in contact with templet 12 and, as it is moved along same, cutting tool 8 will give insulator 1 an outline similar to the templet outline but differing therefrom in size in the same ratio as the distance D—1 bears to distance D—2. By varying the vertical location of templet 11, the ratio between the sizes of the templet and the lathe product will be varied accordingly.

While it is possible to calculate the percentage of shrinkage and set the templet accordingly, in practise, I find it more suitable to test the insulators as they come from the kiln and if they are running over size the lathe operator is instructed to lower the templet slightly. If the kiln product is under size the templet is raised. Any movement of the templet will produce a corresponding variation in the size of the lathe product and therefore in the finished article.

One of the advantages of my construction is the facility with which a templet may be constructed from knowledge of the size of the finished product only, and without regard to the size of the article as it is produced by the lathe. Another advantage is the ease with which the size of the lathe product is varied without any change of templets. By using guiding templets, workmen may produce the lathe product much more rapidly than if the feeding of the cutting tool is done by judgment only and the templet used for gaging only.

If the contour of the cutting edge of tool 8 is an arc of a circle, as is most common, I prefer to utilize a roller 17, mounted on a spindle 18, for the guiding finger contact. Fig. 2 shows such an arrangement and I have indicated the roller shouldered at 19 and supported by a collar 20. By lowering the collar until the larger circumference of roller 17 bears against templet 12, cutting tool 8 will turn a larger article than will be produced by the contact of the smaller circumference of the roller with the templet. In this way the guiding tool may be adapted to feed the cutting tool for a roughing cut and then by shifting the roller collar and without any adjustment of the templet, a finishing cut may be taken. While this feature may only be incorporated when the cutting edge is circular, such a limitation is not serious as it is in comparatively few articles in which the cutting edge is required to be non-circular in outline.

As the tool holder is swung from a point, the variation between templet and turned article is produced longitudinally as well as transversely. The height of bracket 5 should be such that the arc described by the tools in a vertical plane will be insufficient to materially foreshorten the longitudinal movement of the tools.

In the illustration of my device I have shown an arrangement of the templet and tools which will result in a lathe product larger than the templet. If the templet be placed below the spindle center line instead of above the advantages and functions of the present arrangement are retained but the product would be reproduced on a smaller scale. Such an arrangement would be especially desirable where the lathe product was subject to expansion in subsequent steps. I contemplate such variation of my device in the construction of lathes in accordance with my disclosure.

It is not essential that the contour of the templet be to the same scale as the finished article although that scale seems preferable and is likely to be the one adopted in most cases. But the operation of the lathe is independent of the scale relation between the templet and the finished article.

I claim:—

1. The combination with a rotatable work spindle, of a tool holder supported at one end by a universal joint, a cutting tool carried by said holder, a templet and means carried by said holder between said joint and said tool for co-operating with said templet in controlling the movement of said tool.

2. The combination with a rotatable work spindle, of a support suspended for universal movement, a cutting tool carried by said support, a templet located above said cutting tool and a templet follower carried by said support above said tool.

3. The combination with a rotatable work spindle, of a swinging rod supported by a universal joint at a substantial distance from said spindle, a cutting tool mounted on said rod adjacent said spindle, a guide spaced from said spindle and a guide finger carried by said rod for co-operation with said guide.

4. The combination with a rotatable work spindle, of a universally mounted tool support rod, a cutting tool carried by said rod adjacent said spindle, a vertically adjustable templet above said spindle and a templet follower carried by said rod above said tool.

5. The combination with a rotatable work spindle, of a support a distance above said spindle, a tool holder pivoted from said support and capable of swinging toward and from said spindle and longitudinally thereof, a cutting tool carried by said tool holder, a templet above said spindle and a templet follower carried by said tool holder above said tool.

In testimony whereof, I have hereunto subscribed my hand this 9th day of September, 1919.

JOHN S. LAPP.